Jan. 23, 1968    TAKASHI TAKAHASHI    3,364,771
GEAR TRANSMISSION MECHANISM

Filed Dec. 9, 1965    2 Sheets-Sheet 1

INVENTOR
T. Takahashi

BY Richards & Geier
ATTORNEYS

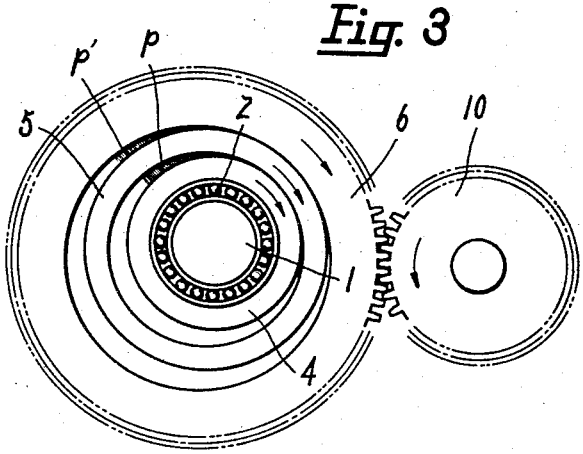
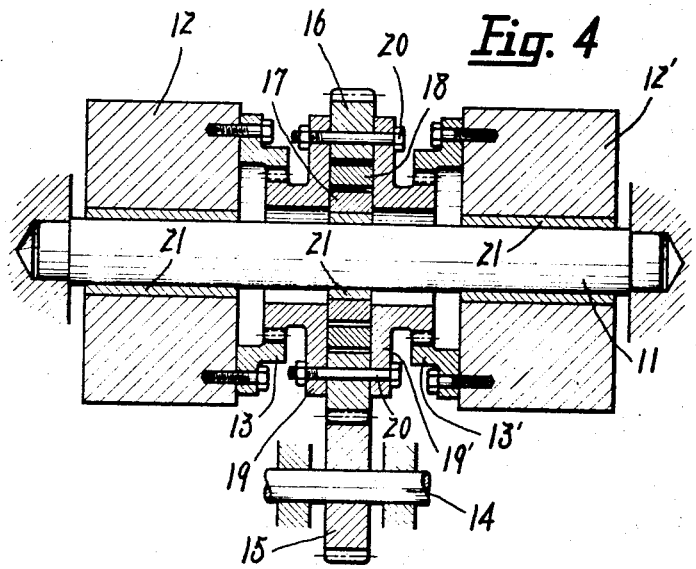

United States Patent Office 3,364,771
Patented Jan. 23, 1968

3,364,771
GEAR TRANSMISSION MECHANISM
Takashi Takahashi, 458 1-chome, Soshigaya,
Tokyo, Japan
Filed Dec. 9, 1965, Ser. No. 512,746
Claims priority, application Japan, Oct. 27, 1965,
40/65,431
1 Claim. (Cl. 74—395)

ABSTRACT OF THE DISCLOSURE

A gear transmission mechanism includes a driven gear rotatably mounted on a fixed shaft and composed of a plurality of concentric ring portions with clearances which are filled with lubricating oil, whereby all ring portions will rotate in the same direction when the driven gear is actuated.

This invention relates to improvements in gear transmission mechanism comprising a pair of meshing gears of which a driven gear is rotatably mounted on a fixed supporting axle. In such a mechanism, it is difficult to obtain perfectly smooth rotation of the driven gear and even distribution of load on tooth faces due to unavoidable errors of pitch, tooth forms etc. However, if the position of the driven gear during rotation were adjustable relative to the fixed axle with the aid of some spring in direction and extent in accordance with any combination of meshing errors without binding, load would be distributed evenly on the teeth of the gear whereby destruction of the teeth would be avoided and the durable life of the gear would be greatly prolonged.

The present invention has for its object to construct the driven gear in such a manner that it can be freely and instantly displaceable relative to the fixed axle with the aid of the spring action exerted by lubricating oil film. According to this invention, the driven gear is divided into two or more than two concentric ring portions leaving slight clearances therebetween into which lubricating oil is introduced and said ring portions rotate together in the same direction.

The function of the oil film will be explained with an ordinary metal bearing by way of example. In such a bearing, oil film which is squeezed between a shaft and bearing metal during the rotation of the shaft will exert spring action to the shaft so as to float the shaft above the bearing metal. If both the shaft and bearing metal rotated together in the same direction instead of the shaft only, the thickness of the squeezed oil film and, therefore, the floating height of the shaft would be nearly doubled as is proven by theoretical calculation.

In the present invention, as mentioned above, the driven gear is composed of two or more than two concentric rings with oil-filled clearances therebetween and said rings rotate together in the same direction and the oil films which are squeezed between the ring portions will exert great spring action whereby the driven gear may displace itself freely relative to the fixed axle in direction and extent in accordance with meshing errors without binding. It is to be noted that since oil film has non-linear spring constant, it is far better than metal springs for my purpose.

The accompanying drawing will serve to illustrate my invention in order that its utility and functioning will be thoroughly understood.

In the drawing:

FIG. 3 is an exaggerated view of the gear showing the function of oil films; and FIG. 4 is a sectional view of an embodiment.

Figure 1:
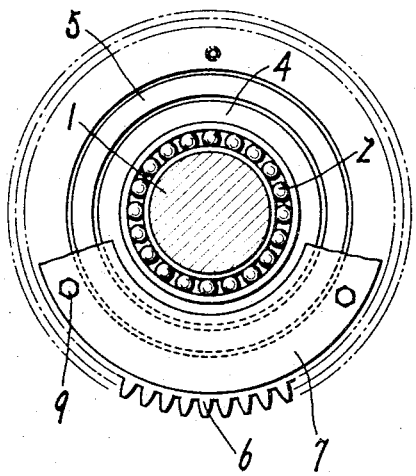
FIG. 1 is a front view of the gear constructed according to this invention with the guide ring partially removed.
Figure 2:
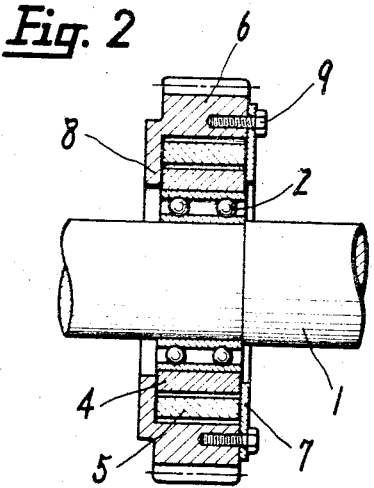
FIG. 2 is a longitudinal section thereof.

Referring to the drawing, particularly FIGS. 1, 2 and 3 showing a gear divided into three concentric ring portions, 1 is a fixed supporting axle, 2 is a ball bearing, 4 is the inner ring attached to the outer race of the ball bearing, 5 is an idle or intermediate ring and 6 is the outer gear ring. The rings 4 and 5 are loosely mounted between a flange 8 formed on the left-hand end of the outer ring 6 and a guide ring 7 secured to the right-hand end of the outer ring 6 by means of bolts 9 leaving a slight clearance therebetween. 10 is a driving gear meshing with the outer ring 6. Lubricating oil is introduced in said narrow clearances $p$ and $p'$. During the rotation, oil in the clearances will be squeezed as exaggeratedly shown in FIG. 3 and acts like spring cushion whereby the rings 5 and 6 may be freely and instantly displaceable on the inner ring 4. As mentioned above, since all of the rings 4, 5 and 6 rotate together in the same direction, the thickness of the squeezed oil films, hence, the spring action thereof will be as much as about twofold greater than when one ring remains stationary.

FIG. 4 shows one embodiment of my invention wherein 11 is a fixed supporting axle, 12 and 12' are heavy cylindrical blocks, such as grindstones, rotatably mounted on said axle, said blocks being provided with inner toothed couplings 13 and 13' respectively, 14 is a driving shaft having a driving gear 15, 16 is a driven gear which is divided into three concentric rings 17, 18 and 16 leaving slight clearances therebetween in which lubricating oil is introduced. 21 is bearing metal. On the left-hand and right-hand ends of the outer ring 16, gear couplings 19 and 19' are secured by means of bolts 20 leaving a slight clearance therebetween. The outer teeth of the couplings 19 and 19' mesh loosely with the inner teeth of the couplings 13 and 13'. As the blocks 12 and 12' are heavy and have great inertia, wrong meshing between the driving and the driven gears would impair the teeth. The drive takes place from the driving shaft 14 and the driving gear 15 through the driven gear 16, the gear coupling 19 and the inner coupling 13 to the block 12. However, the driven gear being being constructed in accordance with my invention, the teeth would not be impaired and the durable life of the gear would be much prolonged.

What I claim is:

1. Gear transmission mechanism comprising a driving gear and a driven gear which is rotatably mounted on a fixed supporting axle, wherein the driven gear is divided into a plurality of concentric ring portions with clearances inbetween, and lubricating oil filling said clearances whereby said ring portions are inter-engaged so that all said concentric ring portions rotate together in the same direction when said driven gear is driven by said driving gear.

References Cited

UNITED STATES PATENTS

| | | | |
|---|---|---|---|
| 3,043,635 | 7/1962 | Bard | 308—9 |
| 3,096,126 | 7/1963 | Wollenweber | 308—9 |
| 3,212,829 | 10/1965 | Gross | 308—9 X |

DONLEY J. STOCKING, Primary Examiner.

L. H. GERIN, Assistant Examiner.